US008881612B2

(12) United States Patent
Wagner

(10) Patent No.: US 8,881,612 B2
(45) Date of Patent: Nov. 11, 2014

(54) INFINITELY VARIABLE VIBRATION EXCITER

(75) Inventor: Jens Wagner, Boppard (DE)

(73) Assignee: Bomag GmbH, Boppard (DE)

( * ) Notice: Subject to any disclaimer, the term of this patent is extended or adjusted under 35 U.S.C. 154(b) by 0 days.

(21) Appl. No.: 13/039,770

(22) Filed: Mar. 3, 2011

(65) Prior Publication Data

US 2012/0055276 A1 Mar. 8, 2012

(30) Foreign Application Priority Data

Mar. 3, 2010 (DE) ........................ 10 2010 010 037

(51) Int. Cl.
*F16H 33/00* (2006.01)
*B06B 1/16* (2006.01)

(52) U.S. Cl.
CPC .................................... *B06B 1/162* (2013.01)
USPC .................................................. 74/61; 74/25

(58) Field of Classification Search
USPC .......................................... 74/61, 86, 87, 25
See application file for complete search history.

(56) References Cited

U.S. PATENT DOCUMENTS 3,368,632 A * 2/1968 Lebelle .......................... 173/49
3,625,074 A * 12/1971 Waschulewski ................. 74/61
4,005,687 A * 2/1977 Jonathan ..................... 123/52.3
4,096,762 A * 6/1978 Bodine ............................ 74/61
4,199,264 A * 4/1980 Uebel .......................... 366/123
4,249,424 A * 2/1981 Glazier ............................ 74/25
4,266,434 A * 5/1981 Burns .............................. 74/61
4,928,554 A * 5/1990 Dryga et al. ..................... 74/87
5,177,386 A * 1/1993 Shimada ......................... 310/81
6,139,218 A * 10/2000 Cochran ....................... 404/113
6,224,293 B1 * 5/2001 Smith .......................... 404/117
7,598,640 B2 * 10/2009 Heichel et al. ................. 310/81
8,070,352 B2 * 12/2011 Heichel et al. ............... 366/128
8,276,471 B2 * 10/2012 Heichel et al. .................... 74/25
2002/0104393 A1 * 8/2002 Van Es et al. .................... 74/87
2007/0272043 A1 * 11/2007 O'Connor ......................... 74/61
2010/0147090 A1 * 6/2010 Kuerten ........................... 74/61
2010/0224016 A1 * 9/2010 Kleibl et al. ...................... 74/61

FOREIGN PATENT DOCUMENTS

DE 24 09 417 A1 9/1975
DE 265 113 A1 2/1989

* cited by examiner

*Primary Examiner* — Troy Chambers
*Assistant Examiner* — Zakaria Elahmadi
(74) *Attorney, Agent, or Firm* — Baker & Hostetler LLP

(57) ABSTRACT

A vibration exciter is provided. The vibration exciter includes a shaft and at least two unbalanced weights arranged on the shaft, in which the radial distance of the common center of gravity of the unbalanced weights from the rotational axis of the shaft is adjustable in an infinitely variable way by means of a gear. The vibration exciter comprises a gear which is a spatial coupling gear, e.g. a spatial vibration slider gear. A simple and compact configuration of the vibration exciter is thus proposed, in which the required adjusting forces for changing the imbalance are very low.

8 Claims, 6 Drawing Sheets

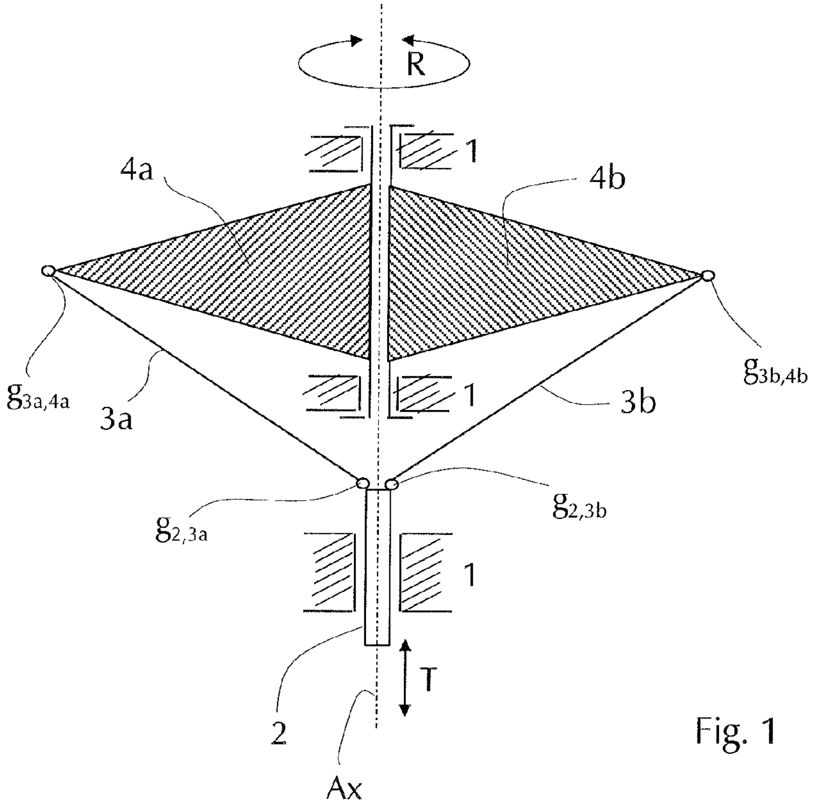
Fig. 1
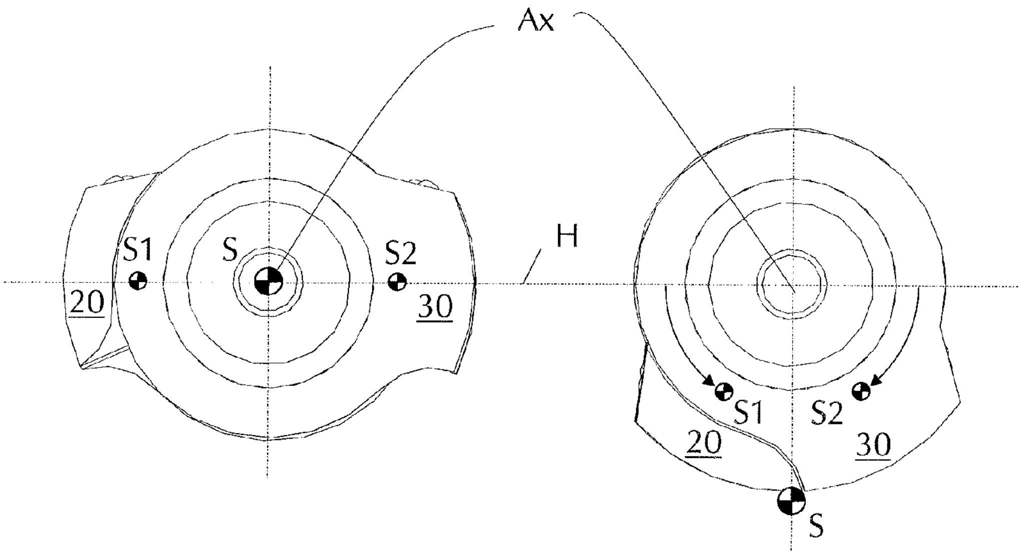
Fig. 2a
Fig. 2b

INFINITELY VARIABLE VIBRATION EXCITER

CROSS-REFERENCE TO RELATED APPLICATIONS

This application claims priority to foreign Patent Application DE 10 2010 010 037.4, filed on Mar. 3, 2010, the disclosure of which is incorporated herein by reference in its entirety.

FIELD OF THE INVENTION

The invention relates to a vibration exciter. More particularly, the invention related to a vibration exciter with a shaft and at least two unbalanced weights arranged on the shaft.

BACKGROUND OF THE INVENTION

In a known vibration exciter with two unbalanced weights, a pin is used for the purpose of the adjustment of the phase position of the unbalanced weights, which pin engages in a groove of a hub extending in a screw-like manner. A translational movement of the pin causes a rotary movement of the hub, so that mutual twisting of the unbalanced weights is enabled. It is disadvantageous that high adjusting forces need to be applied in this case. It is a further disadvantage that a complex coupling needs to be provided between the unbalanced weights. This not only leads to higher costs, but also to a need for a more space.

A counter-rotating vibrator is also known, in which the exciter power can be set continuously during operation. For this purpose, a planar coupling gear is used as a planar oscillating slider. A displacement of the slide rod leads to an oscillating movement of the coupler and the crank, so that the distance of the centers of gravity of the unbalanced weights can be varied in relation to the rotational axis of the unbalanced shaft. In this case too there is a disadvantage that the vibration exciter requires a relatively large installation space both in the axial and the radial direction of the unbalanced shaft on the basis of its principle because the outward vibration of the unbalanced weights in the radial direction is required for increasing the exciter power.

SUMMARY OF THE INVENTION

Embodiments of the present invention advantageously provide a vibration exciter which overcomes the disadvantages of the known vibration exciters of the state of the art.

The vibration exciter in accordance with embodiments of the invention comprises a shaft with at least two unbalanced weights and a gear which is a spatial coupling gear, such as, for example, a spatial vibration slider gear.

"Coupling gears" such as vibration sliders, slider cranks, crank mechanisms, etc. belong to the group of gears with non-uniform transmission and are used when a conversation of a rotary movement into an oscillating movement (straight or oscillating) and vice-versa is required. Coupling gears comprise at least four gear links which are connected by slip joints, i.e. joints such as sliding or rotating joints whose elements slide on one another or touch one another on surfaces. All coupling gears comprise at least one fixed coupler which represents a transmission link which is not mounted or guided in the frame. The coupler or coupling links can be arranged as connecting rods, driving rods, etc. depending on the application.

In comparison with cam gears which represent a widely used type of gear, coupling gears allow a simpler and cheaper production of the gear links. Furthermore, coupling gears can be regarded as being more robust as a result of higher sturdiness of the slip joints.

"Planar coupling gears" are widely used. Planar coupling gears are characterized in that the link points of all links perform a planar movement, i.e. only paths in one plane or in planes which are parallel with respect to each other. "Spherical coupling gears" can be distinguished from these, all link points of which are able to move on paths on spherical surfaces which are concentric with respect to each other.

It is provided in accordance with embodiments of the invention that the gear for adjusting the center of gravity of the unbalanced weights is a special coupling gear. In contrast to planar or spherical ones, the link points of at least one link can perform a spatial movement in relation to at least one other link in spatial coupling gears. Spatial movement shall be understood as being a movement in which at least one point of a body moves along a spatial path which is no longer disposed in a plane. Completely different analytical and synthesis processes apply to spatial coupling gears in comparison with planar or spherical coupling gears.

An infinitely variable adjustment of the amplitude of the vibration or excitation power during operation is enabled in a simple and cost-effective way with the help of the vibration exciter in accordance with embodiments of the invention. The required adjusting forces are very low thanks to the gear kinematics in accordance with the invention. Moreover, the vibration exciter can be built in a very compact way.

In an advantageous embodiment of the invention, the gear comprises an adjusting slide and coupling links, with each coupling link being connected by means of pivot joint connections with the adjusting slide and one of the unbalanced weights.

In accordance with this embodiment, the gear in accordance with the invention concerns a spatial coupling gear with a frame, a drive link arranged as an adjusting slide, two coupling links and two driven links which are preferably connected with the unbalanced weights or are the unbalanced weights themselves. It therefore concerns a parallel gear with two four-link coupling gears.

The pivot joint connections each have a degree of freedom of the joint of f=2 in a further preferred embodiment of the invention.

The degree of freedom of the joint shall be understood as being the degree of freedom which a joint grants a link in relation to the other link connected with the same through the joint. Since pivot joint connections are concerned in this case, every pivot joint connection allows two rotational movements about two different rotational axes. Instead of a pivot joint connection with a degree of freedom of the joint of f=2, it is also possible to use a pivot joint with a higher degree of freedom of the joint of f=3, which is the case for example in a ball joint.

In accordance with an advantageous embodiment of the invention, the pivot joint connections each comprise a rotatably mounted fork head.

A pivot joint connection with a degree of freedom of the joint of f=2 is created with this embodiment in a simple and sturdy way. The first rotational axis is disposed in the pin axis, as is usually the case in fork joints, which axis extends through the cheeks of the fork head. A second rotational axis is formed by a rotatable mounting of the fork head, which second axis extends as a vertical axis of the fork head perpendicularly in relation to the first rotational axis and centrally between the cheeks of the fork head.

According to a further advantageous embodiment of the invention, the shaft comprises axial partial shafts which each comprise an unbalanced weight which is connected with the partial shaft in a torsion-proof and axially rigid manner, with the partial shafts being arranged adjacent to one another by way of rotational sliding surfaces.

According to this embodiment, the total weight of this vibration exciter can be reduced because the shaft need not be arranged continuously. Moreover, the production of the exciter can be simplified by coupling the unbalanced weights with the respective partial shafts in a simple manner by means of a casting process for example. The two unbalanced weights which are arranged adjacent to one another via rotational sliding surfaces are coupled with each other and mounted in a common frame in such a way that a single adjusting drive is sufficient in order to twist the two unbalanced weights relative to one another. The two unbalanced weights are arranged in a mirror-inverted manner with respect to the central point of the shaft. They are equal in respect of their shape and size however, so that simple production is enabled. Preferably, the unbalanced weights extend axially substantially over the entire length of the shaft. An extremely compact vibration exciter is thus produced.

Embodiments of the invention further relate to a directional vibrator for generating a directed vibration with at least two vibration exciters, with the phase being infinitely displaceable between the shafts of the vibration exciter.

A directional vibrator is created by coupling at least two vibration exciters, with the coupling enabling a rotation of the unbalanced shafts which is synchronous and in the opposite direction with respect to one another, which directional vibrator is capable of generating a directed vibration on a specific shaft as a result of the superposition of individual vibrations. Mostly vertically directed vibrations are generated in apparatuses for soil compaction. The phase between the individual vibration exciters is preferably displaceable in infinitely variable manner in the directional vibrator in addition to the amplitude of the vibrations. A phase shall be understood in this connection as the position of the exciter or unbalanced shaft with respect to a reference position to be freely determined on the one hand and also the ratio of sizes of the unbalanced weights with respect to one another on the other hand. If both unbalanced shafts run in equal phases, i.e. if center of gravity vectors of the unbalanced shafts which rotate about the respective rotational axis are arranged parallel with respect to one another in at least two positions and if the unbalanced weights of the two unbalanced shafts are equally large, only forces in the vertical direction are generated. If the two unbalanced shafts have a different phase with respect to one another, i.e. if the center of gravity vectors of the unbalanced shafts do not have any position in which they are arranged parallel with respect to each other or if the unbalanced weights of the unbalanced shafts are differently large, the axis of the directional vibration will incline by a specific angle in relation to the vertical line. This can be advantageous for example in order to produce and adjust a forward drive of the directional vibrator in addition to the compaction of the soil.

Embodiments of the invention further relate to a vibration plate or roller, comprising a directional vibrator with two vibration exciters. The vibration plate or roller can thus be produced in a simple and cost-effective way and with only low adjusting forces during operation. It is possible to adjust in an infinitely variable manner not only the amplitude of the directed vibration but also the inclination of the vibration axis in relation to the vertical line, so that the magnitude of the imbalance and the speed and the travelling direction of the vibration plate or roller can be adjusted depending on the application.

BRIEF DESCRIPTION OF THE DRAWINGS

The invention will be explained below in closer detail by reference to embodiments schematically shown in the drawings, wherein:

FIG. 1 shows a kinematic diagram of the spatial coupling gear in accordance with an embodiment of the invention;

FIG. 2*a* shows a front view of the vibration exciter in the case of minimal imbalance;

FIG. 2*b* shows a front view of the vibration exciter in the case of maximum imbalance;

DETAILED DESCRIPTION

Figure 3:
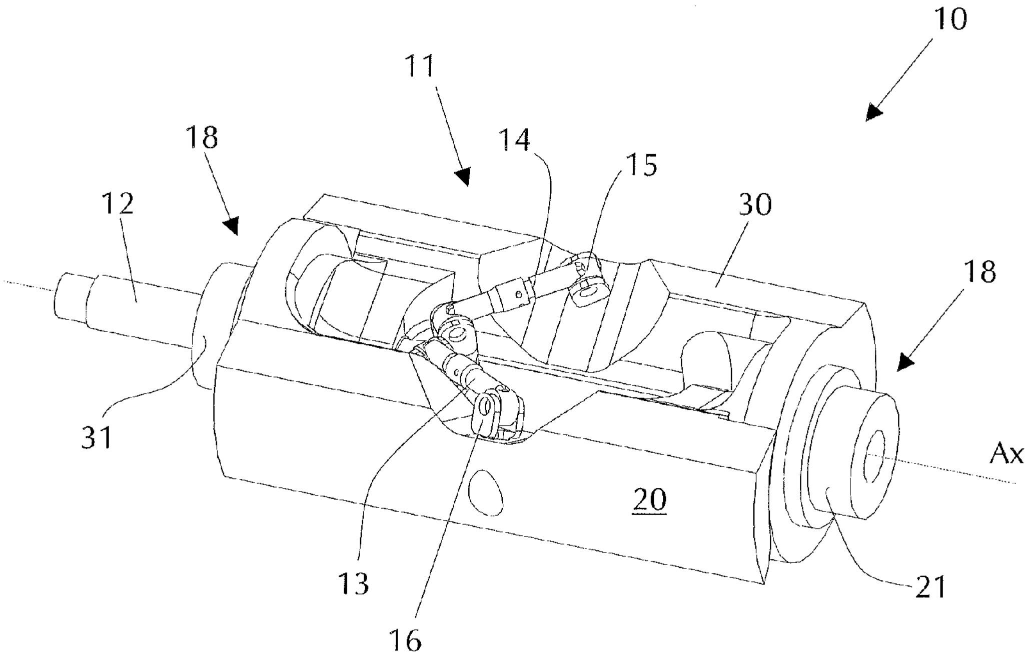
FIG. 3 shows a perspective view of the vibration exciter in the case of minimum imbalance.

FIG. 1 shows a kinematic diagram of the spatial coupling gear in accordance with an embodiment of the invention. The gear can be broken down into two four-link gears, namely a first four-link with a frame 1, a drive link 2, a first coupler 3*a* and a first driven link 4*a*, and a second four-link with a frame 1, a drive link 2, a second coupler 3*b* and a second driven link 4*b*. The couplers 3*a*, 4*a* are connected with the drive link 2 via the joints $g_{2,3a}$ and $g_{2,3b}$ and with the driven links 4*a*, 4*b* via joints $g_{3a,4a}$ and $g_{3b,4b}$. A translational movement of the drive link 2 along the axis Ax according to arrow T is converted into a vibrating movement of the driven links 4*a*, 4*b* about the axis Ax according to arrow R, with the directions of rotation of the driven links 4*a*, 4*b* being opposite of one another. The couplers 3*a*, 3*b* each perform a spatial movement during the adjustment.

FIG. 2*a* shows a front view of an embodiment of the vibration exciter in accordance with the invention in a position in which partial imbalances generated by the imbalance masses 20, 30 cancel each other out, so that the total imbalance is minimal, i.e. it is substantially zero. The center of gravity S which is formed on the one hand by the partial center of gravity S1 of the first unbalanced weight 20 and on the other hand by the partial center of gravity S2 of the second unbalanced weight 30 lies in this position on the horizontal line H, so that there is no radial distance to the rotational axis Ax. No relevant imbalance will thus occur.

FIG. 2*b* shows the front view of the vibration exciter of FIG. 2*a* in a position in which the vibration amplitude or the total imbalance is at a maximum. As a result of the gear for adjustment, the unbalanced weights 20, 30 and thus also their centers of gravity S1, S2 are twisted towards one another along the indicated directions of the arrows, so that the center of gravity S now has a clear distance from the horizontal line H and the rotational axis Ax respectively. The larger the distance S from the rotational axis Ax, the larger the generated imbalance. The distance of the center of gravity S from the rotational axis can be set in an infinitely variable manner between the minimum value 0 as shown in FIG. 2*a* and the maximum value as shown in FIG. 2*b*.

FIG. 3 shows a perspective view of the vibration exciter 10 in accordance with the invention. The housing is not shown for the purpose of better clarity of the illustration. The vibration exciter substantially comprises the gear 11 which on its part comprises an adjusting slide 12, the two coupling links 13, 14, the imbalance masses 20, 30 and the four pivot joint connections 15. The exciter housing which is not shown here corresponds to the frame 1 as shown in FIG. 1. The adjusting slide 12 corresponds to the drive link 2 of FIG. 1. The coupling links 13, 14 represent the couplers 3*a*, 3*b* of FIG. 1. The unbalanced weights 20, 30 correspond to the driven links 4*a*, 4*b* of FIG. 1. The four pivot joint connections 15 represent the joints $g_{2,3a}$, $g_{2,3b}$, $g_{3a,4a}$, $g_{3b,4b}$ of FIG. 1. The shaft 18 of the vibration exciter 10 is composed on the one hand of a first hollow-drilled partial shaft 21 which carries the first unbalanced weight 20 and on the other hand of a second hollow-drilled partial shaft 31 which carries the second unbalanced weight 30. No imbalance is produced in the illustrated position (FIG. 2*a*).

Figure 4:
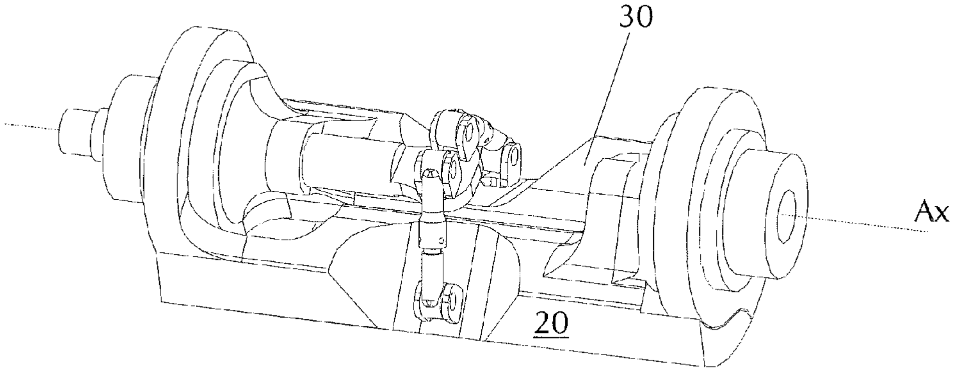
FIG. 4 shows a perspective view of the vibration exciter in the case of maximum imbalance.

FIG. 4 shows a perspective view of the vibration exciter 10 of FIG. 3, but in a position in which the generated imbalance is at a maximum (FIG. 2*b*). The adjusting slide 12 is slid for this purpose in the direction towards the unbalanced weights 20, 30. The rigid coupling links 13, 14 which are connected with the slide in an articulated manner each perform a spatial movement, as a result of which the unbalanced weights 20, 30 with the partial shafts 21, 31 which are also connected with the same in an articulated manner perform a rotational movement around the rotational axis Ax. During the operation of the vibration exciter, the rotational movements of the unbalanced weights 20, 30 which are caused by the gear 11 are superimposed on the rotational movements of the unbalanced weights 20, 30 which are caused by the exciter drive or vibration drive (not shown).

Figure 5A:
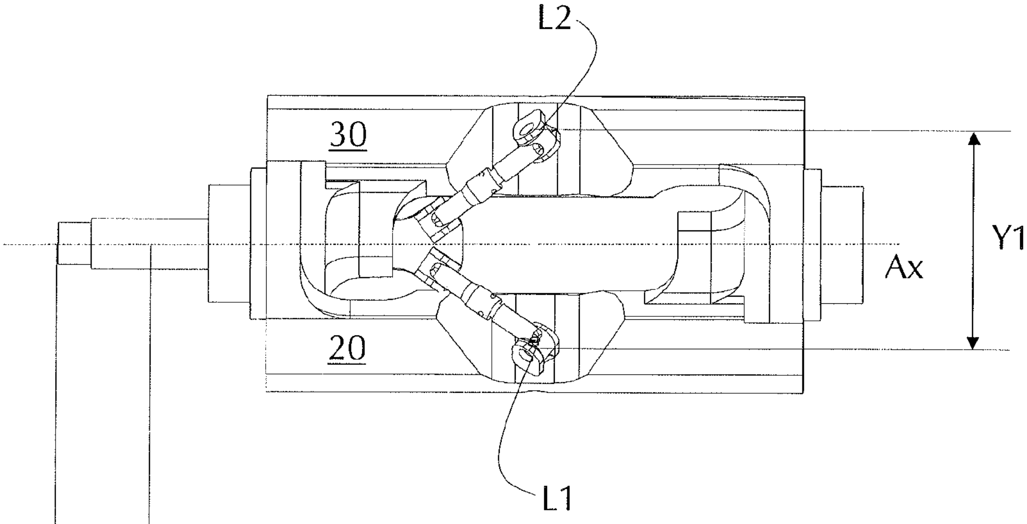
FIG. 5*a* shows a top view of the vibration exciter in the case of minimum imbalance.
Figure 5B:
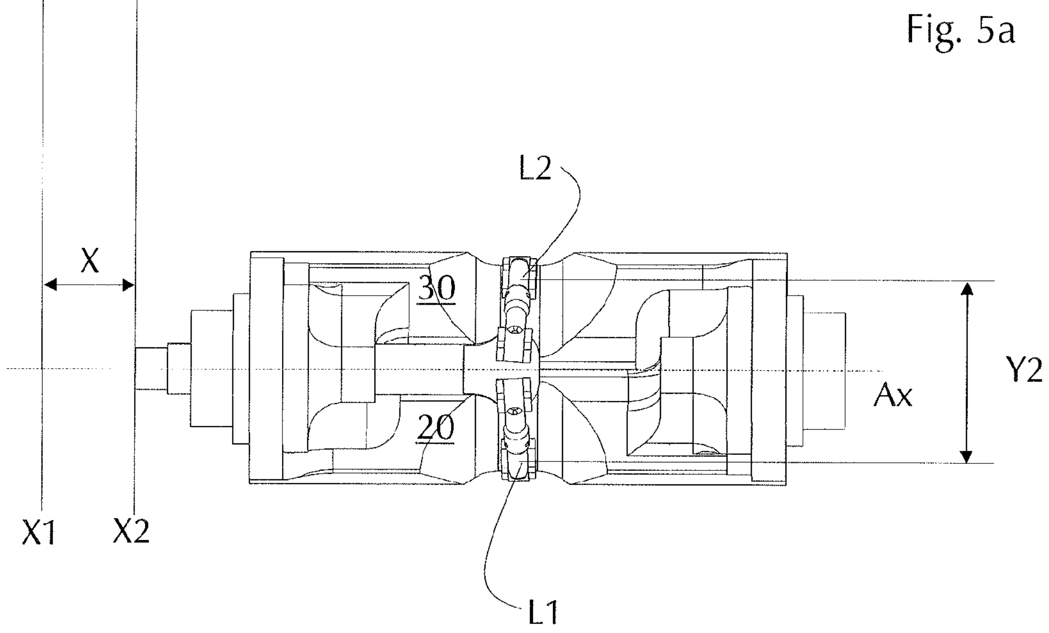
FIG. 5*b* shows a top view of the vibration exciter in the case of maximum imbalance.

FIGS. 5*a*, 5*b* show the top views of the vibration exciter 10 before and after adjustment. In the initial position, when no imbalance is to be produced (FIG. 2*a*), the one end of the adjusting slide is at position X1. The bearing points L1, L2 where the fork heads 15 of the pivot joint connections 15 are rotatably held are spaced from one another by a distance Y1.

As is shown in FIG. 5*b*, the mentioned end of the adjusting slide 12 is brought to position X2 by the amount X via a hydraulic cylinder or a linear motor (both are not shown) for the purpose of adjusting the imbalance. This corresponds to the position for the maximum imbalance (FIG. 2*b*). The unbalanced weights 20, 30 are twisted about the rotational axis Ax towards one another, so that in the top view the distance Y2, which is smaller than the distance Y1 of FIG. 5*a*, can be recognized. Any position of the adjusting slide 12 can be adjusted in an infinitely variable manner between X1 and X2.

Figure 6:
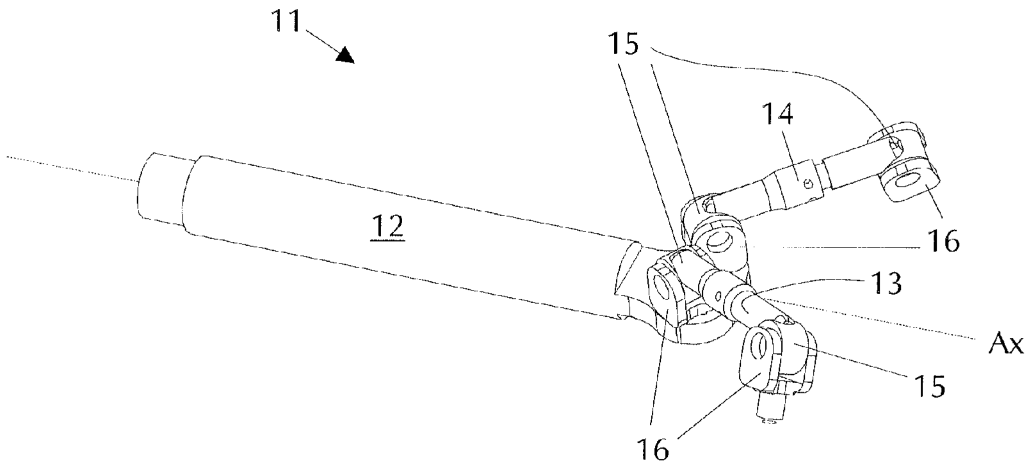
FIG. 6 shows a perspective view of the adjusting slide with the coupling links and pivot joint connections of FIG. 3.

FIG. 6 shows a part of the transmission 11 of FIG. 3. The adjusting slide 12 substantially comprises a cylindrical part which is guided in the bore hole of the partial shaft 31. A shaft shoulder can be seen on the left end of the adjusting slide 12 which is used for receiving a roller bearing (not shown). At the opposite end of adjusting slide 12, two fork heads 16 are rotatable about a vertical axis each and form a pivot joint connection 15 with a degree of freedom of the joint of f=2. The rigid coupling links 13, 14 are connected with the same, which are respectively connected again by means of pivot joint connections 15 with the unbalanced weights 20, 30 (not shown here). Instead of the illustrated pivot joint connections 15 with rotatably mounted fork heads 16, the coupling links 13, 14 can also be rotatably coupled via ball joints (f=3) on the adjusting slide 12 or on the unbalanced weights 20, 30. It is alternatively also possible to provide pivot bearings for the rotatable connection of the coupling links 13, 14 on the adjusting slide 12 or on the unbalanced weights 20, 30.

Figure 7:
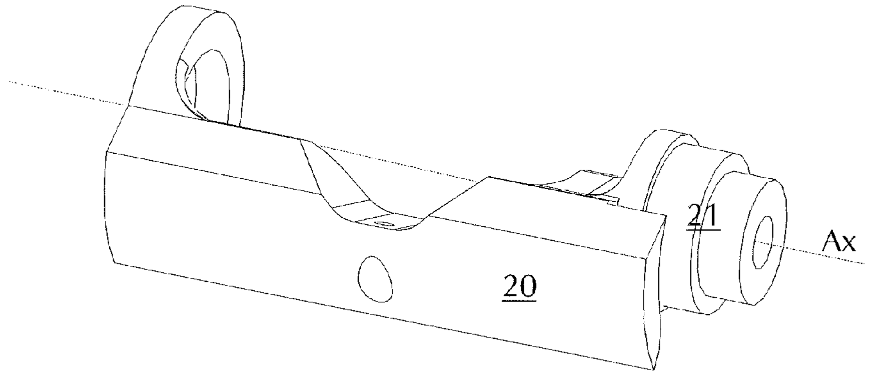
FIG. 7 shows a perspective view of the first unbalanced weight of FIG. 3.
Figure 8:
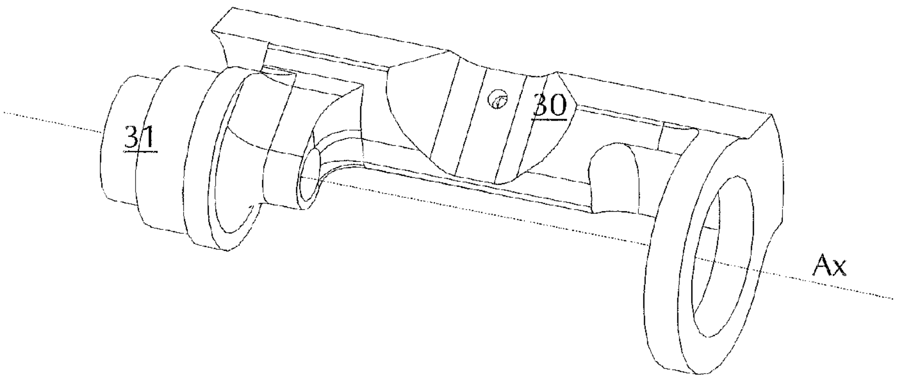
FIG. 8 shows a perspective view of the second unbalanced weight of FIG. 3.

FIGS. 7 and 8 show the unbalanced weights 20, 30 of FIG. 3 in detail. The partial shafts 21, 31 which are integrally produced with the unbalanced weights 20, 30 are clearly visible. It is also clearly shown that the unbalanced weights 20, 30 are identical. In the assembled state, the one end (with the larger bore) of the second unbalanced weight 30 can slide in a rotational manner on the outer jacket surface of the partial shaft 21 of the first unbalanced weight 20. Accordingly, the one end of the first unbalanced weight also forms a rotational sliding surface together with the partial shaft 31 of the second unbalanced weight. The mentioned sliding partners slide relative to one another during the adjustment of the distance of the center of gravity. It can further be seen that the axial extension of the unbalanced weights 20, 30 corresponds substantially to the axial extension of the shaft 18 with the partial shafts 21, 31.

Figure 9:
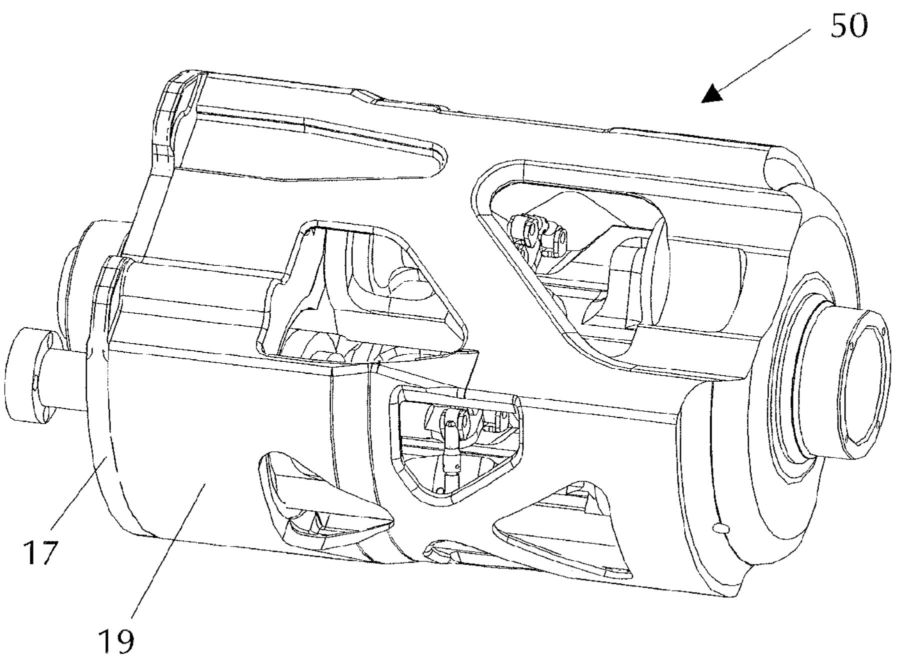
FIG. 9 shows a perspective view of the directional vibrator.

FIG. 9 shows a directional vibrator 50 with two vibration exciters according to the invention, plus an exciter housing 19 and a cover 17.

Figure 10:
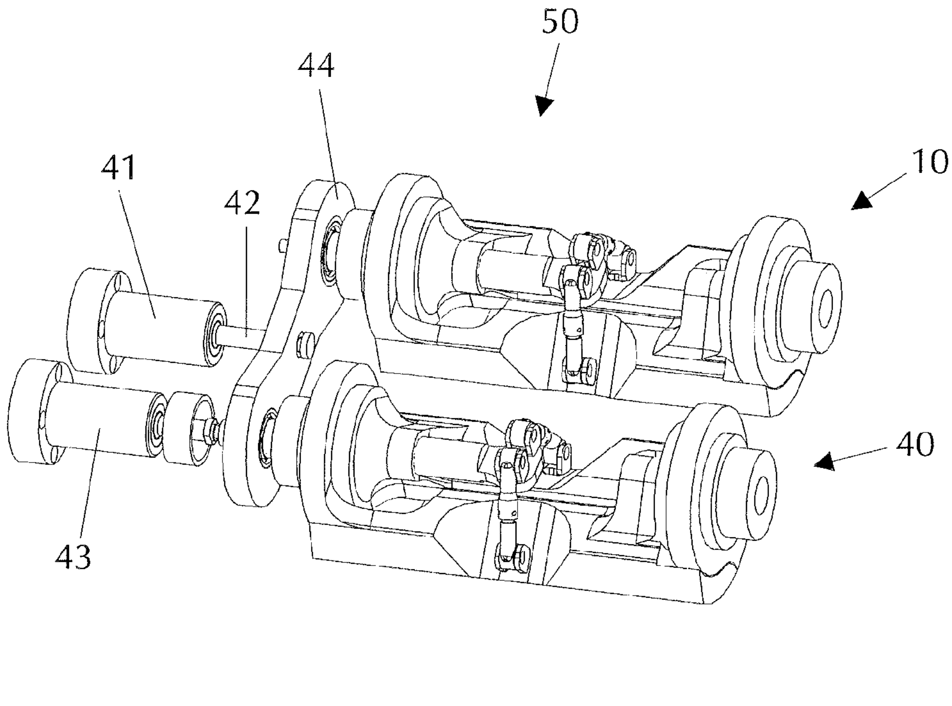
FIG. 10 shows a perspective view of the directional vibrator of FIG. 9 without the exciter housing and cover in the case of maximum imbalance.

FIG. 10 shows the directional vibrator 50 of FIG. 9, but without the cover 17 and the exciter housing 19. The directional vibrator 50 comprises two vibration exciters 10, 40 which are arranged next to one another and which comprise means (not shown) for synchronous rotation in the opposite direction of the unbalanced shafts. Instead of the adjustment by means of separate adjusting cylinders, it is appropriate to provide a main adjusting cylinder 41 with an adjusting piston 42. The connection element 44 which is connected with the adjusting piston 42 ensures a synchronous adjustment of the adjusting slide of the vibration exciter 10, 40. The auxiliary cylinder 43 is provided for the purpose that a phase adjustment can be made of the unbalanced shaft of the vibration exciter 40 with respect to the unbalanced shaft of the vibration exciter 10. In the position as shown in FIG. 10, the unbalanced shafts of the vibration exciters 10, 40 run in the same phase with maximum imbalance. As a result, the exciter power generated by the directional vibrator 50 is directed upwardly and downwardly.

Figure 11:
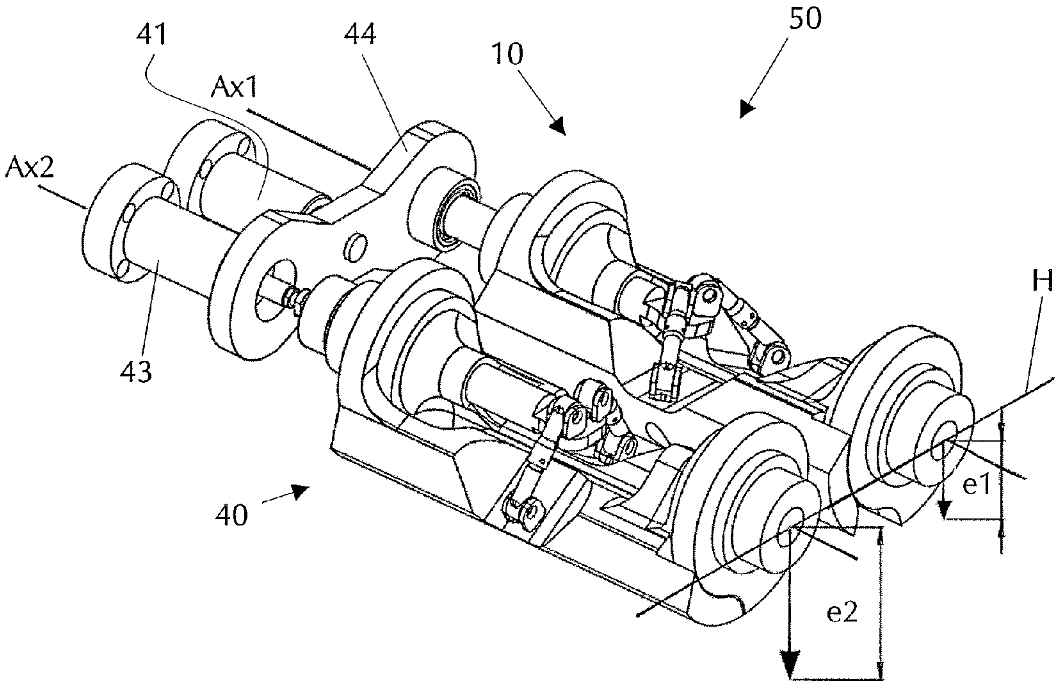
FIG. 11 shows a perspective view of the directional vibrator of FIG. 10 with phase shifting.
Figure 12:
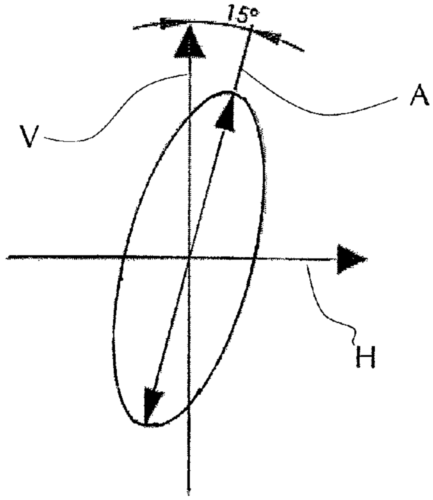
FIG. 12 shows the progression of the amplitude of the directed vibration with phase shifting according to FIG. 11.

FIG. 11 shows the directional vibrator 50 of FIG. 10, but with a phase shift. The phase of the shaft of the first vibration exciter 10 is shifted in relation to the shaft of the second vibration exciter 40 in such a way that the imbalance of the first vibration exciter 10 has an eccentricity e1 as a result of an adjusting movement, which eccentricity e1 has a lower value (as also schematically shown in FIG. 11) than the eccentricity e2 of the imbalance of the second vibration exciter 40. Since the imbalance U is calculated according to the formula U=m*e from the product of mass m and the eccentricity e (distance of center of gravity from the rotational axis), the imbalance of the first vibration exciter 10 is smaller than the imbalance of the second vibration exciter 40. As a result of the synchronous rotation in the opposite direction of the shafts of the vibration exciters 10, 40, a directed vibration is generated whose axis A is not vertical, i.e. perpendicular to the horizontal line H, but is inclined by a certain angle, e.g. 15°, in relation to the vertical axis V, as is also clearly shown in FIG. 12. This can appropriately be used for setting a separate forward and rearward movement of a vibration plate which comprises a directional vibrator 50 in accordance with the invention.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A vibration exciter, comprising:

a shaft;

at least two unbalanced weights arranged on the shaft, and a gear by which a radial distance of a common center of gravity of the unbalanced weights from a rotational axis (Ax) of the shaft is adjustable in an infinitely variable manner, wherein each of the unbalanced weights is connected with said shaft in a torsion-proof and axially rigid manner, and wherein the unbalanced weights are mounted in a common frame and arranged adjacent to one another via rotational sliding surfaces in such a way that a single adjusting drive is sufficient in order to twist the two unbalanced weights relative to one another, and wherein the gear is a spatial coupling gear which comprises an adjusting slide as a drive link and coupling links, with each coupling link being connected by pivot joint connections with the adjusting slide and one of the unbalanced weights in such a manner that the unbalanced weights can be twisted relative to each other synchronously via the adjusting slide, the synchronous relative twisting movement being a synchronous rotational movement of the unbalanced weights about the rotational axis (Ax) of the shaft, with the unbalanced weights maintaining their axial position and the rotational movement of the unbalanced weights occurring in opposite directions with respect to one another, that is towards each other or away from each other.

2. The vibration exciter according to claim 1, wherein the gear is a spatial vibration slider gear.

3. The vibration exciter according to claim 1, wherein the pivot joint connections each comprise a degree of freedom of the joint of f=2.

4. The vibration exciter according to claim 1, wherein the pivot joint connections each comprise a rotatably mounted fork head.

5. The vibration exciter according to claim 3, wherein the pivot joint connections each comprise a rotatably mounted fork head.

6. The vibration exciter according to claim 1, wherein the shaft comprises coaxial partial shafts which each comprise one unbalanced weight, with the partial shafts being arranged adjacent to one another via rotational sliding surfaces.

7. The vibration exciter for generating a directed vibration with at least two vibration exciters according to claim 1, with the phase between the shafts of the vibration exciter being displaceable in an infinitely variable manner.

8. A vibration plate or roller, comprising a directional vibrator according to claim 6.

* * * * *